(No Model.)
J. S. DONOHO & J. W. GATES.
COMBINED CLOD CRUSHER, HARROW, AND WEED CUTTER.
No. 374,178. Patented Dec. 6, 1887.
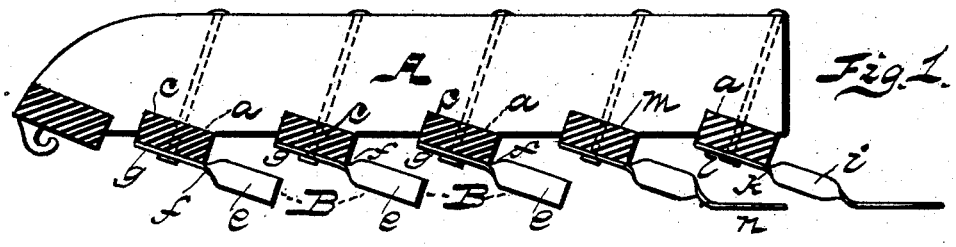
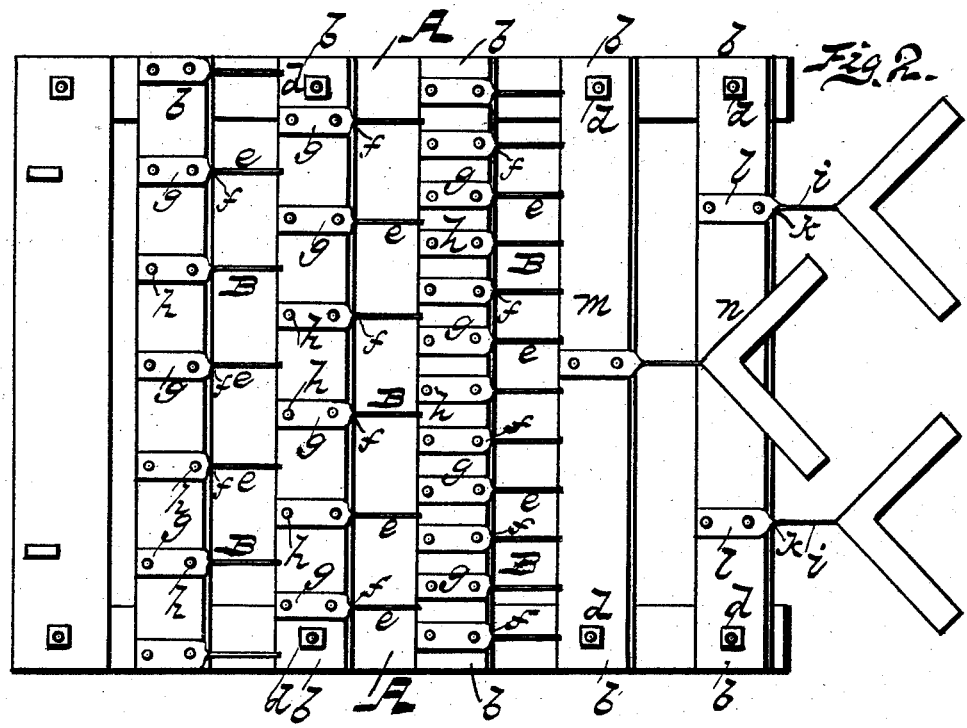
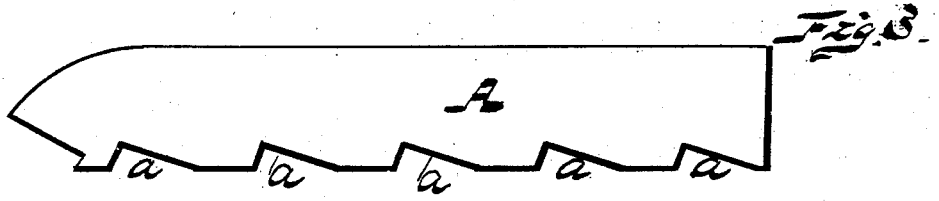
WITNESSES
J. B. Clarke
Andrew Hill
INVENTOR
J. S. Donoho
J. W. Gates
By E. H. Bates
Attorney

United States Patent Office.

JAMES S. DONOHO AND JAMES W. GATES, OF VACAVILLE, CALIFORNIA.

COMBINED CLOD-CRUSHER, HARROW, AND WEED-CUTTER.

SPECIFICATION forming part of Letters Patent No. 374,178, dated December 6, 1887.

Application filed October 8, 1887. Serial No. 251,821. (No model.)

*To all whom it may concern:*

Be it known that we, JAMES S. DONOHO and JAMES W. GATES, both citizens of the United States, residing at Vacaville, in the county of Solano and State of California, have invented certain new and useful Improvements in a Combined Clod-Crusher, Harrow, and Weed-Cutter; and we do hereby declare the following to be a full, clear, and exact description of the invention, such as will enable others skilled in the art to which it appertains to make and use the same.

This invention relates to improvements in a combined clod-crusher, harrow, and weed-cutter; and it consists in the peculiar construction and novel arrangement of the same, all as will be hereinafter fully explained, and particularly pointed out in the appended claim.

The annexed drawings, to which reference is made, fully illustrate our invention, in which—

Figure 1 represents a vertical sectional view of our device. Fig. 2 is a bottom view of the same, and Fig. 3 represents a side view of one of the side bars.

Referring by letter to the accompanying drawings, A A designate the side bars of the device, which are provided with notches $a$ on their under side, in which is placed the ends $b$ of the transverse bars $c$, and secured in place by bolts $d$, thereby connecting the two side bars to one another.

On the under side of the forward cross-bars are secured cutters B, which are constructed with a blade, $e$, and twisted, as at $f$, to provide a flat portion, $g$, which latter is vertically perforated to receive bolts $h$, which pass through the transverse bar and secure the blade thereto.

The rear transverse bar of the frame is provided with Y-shaped cutting-blades, the neck portion $i$ of which also forms a cutter, and the same is twisted, as at $k$, to provide a flat portion, $l$, which is perforated to receive bolts by which they are secured to the transverse bar aforesaid. These Y-shaped weed-cutters on the rear transverse bar are arranged to one side of the center of the frame, and on the next transverse bar, $m$, is secured a similar Y-shaped cutter, $n$, which latter is secured to the center of its transverse bar.

It will be seen by reference to the annexed drawings that we provide in one implement a combined clod cutter or pulverizer, a leveler, harrow, and a weed-cutter, and by forming angular notches in the side bars to receive the ends of the transverse bars the desired angle is obtained for the knives, which gives them a draw cut as the frame is drawn forward.

The top edges of the side bars are formed to represent runners, which serve to ride the frame over the ground when it is desired to take the same from one field to another field or to take it to the barn, and in transporting it the frame is turned upside down, or upon its back. The draft-chain is secured to the front bar of the machine.

It will be observed that we arrange the harrow-blades upon the transverse bars by having those on the first blade-bar wide apart and those on the next bar to it in line between the cutters just mentioned, and the last row on the next bar are closer together, thus providing means whereby the ground is broken finely or pulverized.

If desired, the weed-cutters can be removed when it is desired to harrow the ground, and transporting-wheels may be attached to the side bars, if preferred.

Having described our invention, what we claim, and desire to secure by Letters Patent, is—

The combination of the side bars having the angle-notches on the under side, the transverse bars engaging said notches and bolted thereto, the harrow blades or cutters having the twist and flat perforated forward portion and secured to said bars, and the weed-cutters having the cutting-wings and cutting-neck portion and twisted to provide the flat perforated portion for attachment to the transverse bars, the whole constructed, combined, and arranged as shown and described.

In testimony whereof we affix our signatures in presence of two witnesses.

JAMES S. DONOHO.
    JAMES W. GATES.

Witnesses:
 JOSH DONALDSON,
 EDW. FISHER.